Sept. 8, 1964  C. W. MARSH  3,147,749
SURGICAL INSTRUMENT FOR CONIZATION OF THE CERVIX
Filed Oct. 30, 1961  3 Sheets-Sheet 2
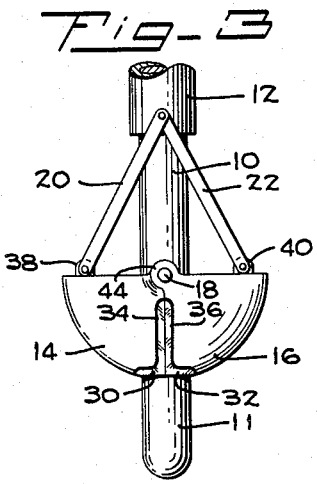
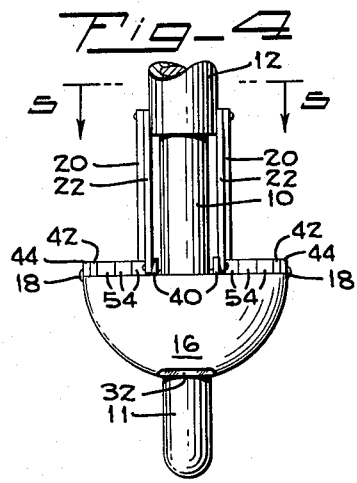
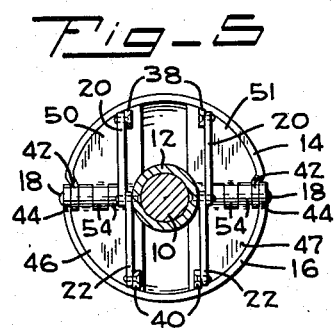
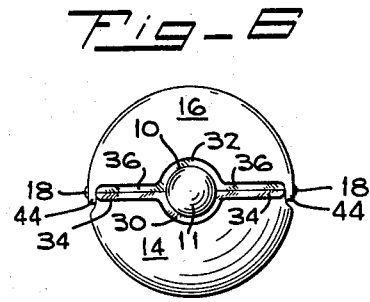
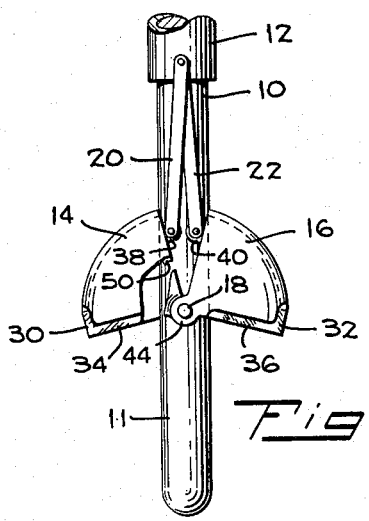
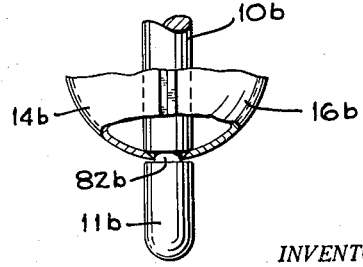
INVENTOR.
CHARLES W. MARSH
BY C. E. Tripp
ATTORNEY INVENTOR.
CHARLES W. MARSH
BY C. E. Tripp
ATTORNEY

United States Patent Office
3,147,749
Patented Sept. 8, 1964

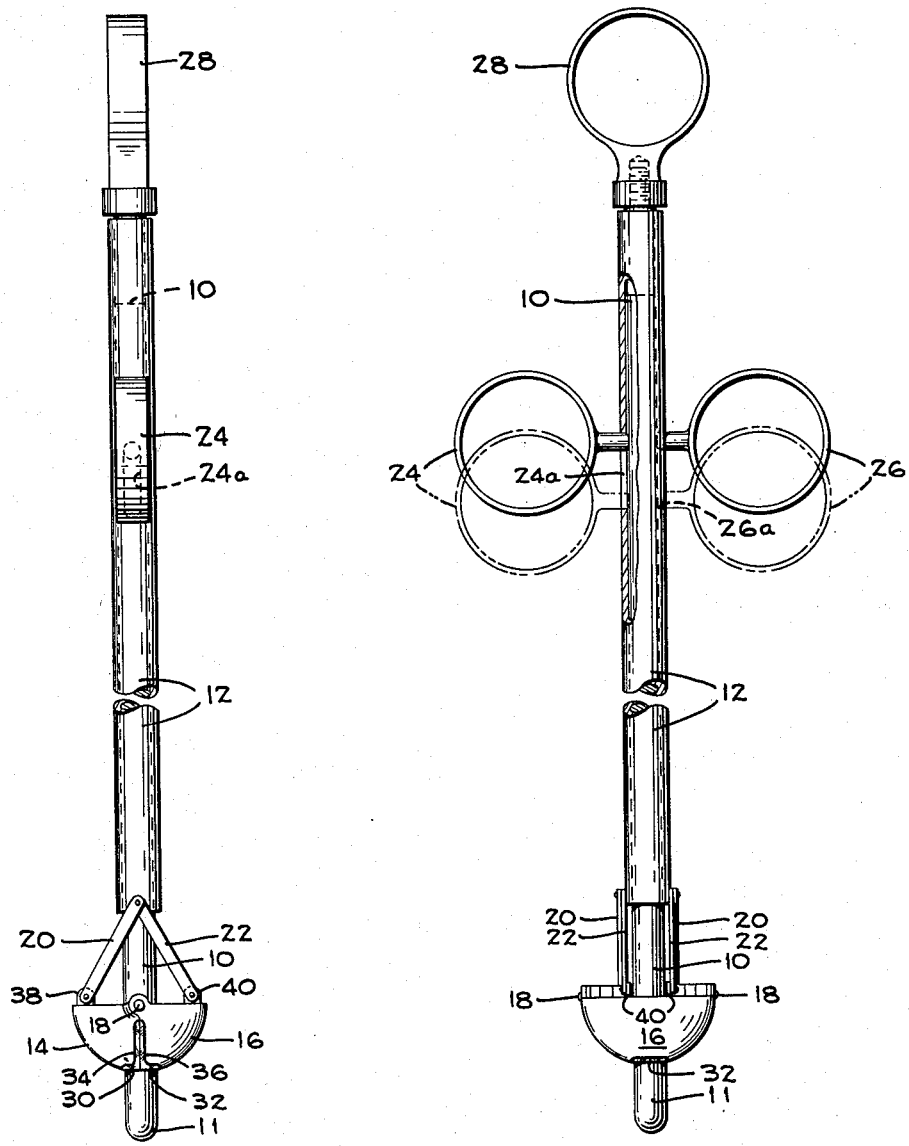

3,147,749
SURGICAL INSTRUMENT FOR CONIZATION
OF THE CERVIX
Charles W. Marsh, Longview, Tex.
(114 Noblitt Court, Tullahoma, Tenn.)
Filed Oct. 30, 1961, Ser. No. 148,351
10 Claims. (Cl. 128—2)

The invention relates to surgical instruments for cold conization of the uterine cervix.

The instrument of the present invention makes possible improved techniques in conization of the cervix for biopsy, or for partial excision biopsy, as well as facilitating the removal of diseased tissue, including preinvasion lesions such as cancer in situ.

The use of cervical cytology as a cancer screening tool has been recognized for a few decades as providing the most reliable means of providing statistically confirmable histological information, concerning the nature of suspected cervical tissue. However, with the instruments now available, the operation leaves much to be desired. As will be seen, the instrument of the present invention offers promise of general acceptance and utilization of this valuable diagnostic technique.

*Prior Problems in Cold Conization*

Even a normally positioned cervix is not directly accessible for symmetrical conization by an instrument that requires oscillation about the axis of entry, such as a unitary knife with a canted blade. The use of cautery or hot conization is contraindicated because of the resulting tissue coagulation. Thus, severe difficulties have been presented to the surgeon who seeks a unitary, untraumatized specimen with intact and unabraded mucosa.

I have found that instruments that rely upon rotation of a conical cutter about the axis of entry, usually accompanied with an axial slicing motion not only provide a shallow or narrow angle conical section, but such instruments have been found to macerate the specimen. It has been my experience that the initial incision must usually be followed up with a severing operation performed with a special unitary oscillated knife, so that in practice little is gained by the use of these rotatable knives.

None of the cold conization instruments of which I am aware can consistently provide a specimen that is free of the undesirable characteristics outlined above, particularly in cases wherein the cervix has an anomalous disposition in the uterus.

The excision of a wide angle conical specimen which includes lesions that have spread radially from the external os or from the cervical canal, including erosion surrounding the external os has heretofore required skill and patience. The benefits of this necessarily timely operation may be irretrievably postponed in case the combination of skill and instrumentation required are not available.

Instruments that demand visual evaluation of the progress of the operation, handicap the surgeon in the case of severe bleeding. This interferes with, or may even interrupt the operation. Thus, instruments that promote bleeding due to their crude performance, and instruments that result in torn, jagged wounds, aggravate this difficulty.

The difficulties referred to in these introductory remarks are either eliminated or minimized when the instrument of the present invention is employed for the cold conization operation by a surgeon. Before describing the present invention in detail, the advantages of the instrument will be summarized, followed by a brief description of the nature of the instrument.

*Advantages of the Instrument*

(1) Operates within confines of its own axis—requires no rotation or conical sweeping.

(2) Excises intact, untraumatized specimens for biopsy.
(3) Removes lesions.
(4) Less loss of blood.
(5) Requires little or no visual observation during the operation.
(6) Easily positioned for the operation.
(7) Adjustable tips available for various size canals.
(8) Can be made in several sizes to be employed successively to obtain deep specimens as well as anterior specimens.
(9) Exceptionally rapid technique made possible.

*Brief Description of the Instrument*

The heart of the instrument is a pair of pivotally mounted blades that cooperate to form a hemisphere, in both their open and closed positions. The blades are pivoted on an elongate slender shank and are forwardly sharpened, to present an initially circular cutting edge. After insertion of the tip of the shank into the external os of the cervix, the blades are readily closed by manipulation thereof from the distal end of the shank, whereupon a clearly cut, hemispherical specimen is completely excised. The specimen remains in the closed blades as the instrument is withdrawn. The entire operation (after examination and preparation) can be performed in a matter of seconds, and with a minimal bleeding. The wound, being clean and unabraded, is readily treated and heals promptly.

A detailed description of an instrument embodying the present invention follows. In the drawing:

FIG. 1 is a side elevation of the instrument of the invention with the blades in their closed position.

FIG. 2 is a corresponding front elevation of the instrument.

FIGS. 3 and 4 are enlarged views of the blade portion of the instrument corresponding to FIGS. 1 and 2, respectively.

FIG. 5 is a section taken on line 5—5 of FIG. 4.

FIG. 6 is an end view with the blades closed.

FIG. 7 is a view like FIG. 6 with the blades opened and partially broken away.

FIG. 12 is another form wherein the tip of the shank is unitary but grooved.

Figure 8:
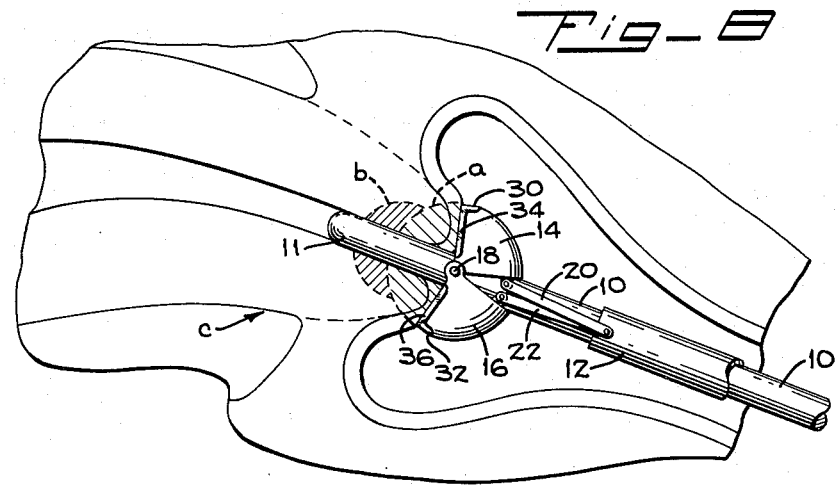
FIG. 8 is a diagram showing the instrument in place with the blades open, before the excision is performed.

Referring to FIGS. 1–7 of the drawings, the instrument includes an elongate blade mounting shank 10 having a rounded proximal tip 11. The shank is telescoped within a blade operating sleeve 12. Blades 14 and 16, each of which form a quarter-sphere shell, to be referred to as a semisphere, are pivotally mounted at the proximal portion of shank 10 by means of a pivot pin 18. Blade 14 is connected to the end of sleeve 12 by means of links 20, and blade 16 is correspondingly connected by means of links 22. When the quarter-sphere blades (termed semispheres) are closed, they cooperate to form a half-sphere, which will be referred to as a hemisphere.

As seen in FIGS. 1 and 2, manipulating finger receiving grips or eyes 24 and 26, project oppositely from adjacent the distal end of the shank 10. Sleeve 12 is slotted at 24a, 26a, to receive the stems of eyes 24, 26, respectively. A thumb receiving eye or grip 28 is secured to the distal end of sleeve 12. Retraction of eyes 24, 26 by the fingers toward the eye 28 from the position shown in broken lines in FIG. 2 to that shown in solid lines, closes the blades and makes the excision. As previously mentioned, the semispherical blades 14 and 16 cooperate to form an anteriorly open hemisphere in their open position, and an anteriorly closed hemisphere in their closed position.

Additional details of the blades and their mounting appear in FIGS. 3–7. Blades 14 and 16 are relieved at 30, 32 to receive the shank 10, and the edges of these relieved portions are keenly sharpened. The radial anterior edges 34, 36 of blades 14, 16 respectively are also sharpened, and cooperate with sharpened edges 30, 32 to form a substantially continuous cutting edge. The links 20, 22 are pivoted to ears 38, 40 projecting from blades 14, 16, by means of screws or rivets, and rivets may be employed as pivots for the links on the sleeve 12. Interlocking hinge ears 42, 44 are formed on blades 14, 16 to receive pin 18. The posterior side of the blade 14 is partially closed by flat plates, 46, 47 (FIG. 5) separated by an open space to receive the shank 10. With this construction, the flat plates do not interfere with the specimen. Companion flat plates 50, 51 partially close blade 16 posteriorly. As seen in FIG. 7, the spaces between these plates receive the shank and permit substantially full 180° opening of the blades. As seen in FIG. 5, cooperating and interlocking hinge parts 54 are formed on that flat plates 46, 46a and 50, 50a for receiving the hinge pin 18.

The initiation of the operation is illustrated in FIG. 8. Access to the cervix C is facilitated by the conventional use of a weighted speculum (not shown) and traction forceps applied to the exposed portion of the cervix (also not shown). The tip of the shank 10 is inserted into the external os of the cervical canal, it may or may not reach the internal os, depending upon the size of the instrument. The blades are closed during initial insertion to avoid wounding the untreated parts, but are opened to the position of FIG. 7 just before completion of the insertion.

The blades are firmly closed by simple manipulation of the thumb and finger eyes 28 and 24, 26 (not seen in FIG. 7) to clearly sever the specimen shaded at a in that figure. The instrument and its hemispherical specimen are then readily removed, the links 20, 22 preventing difficulty with hanging up of the blades in the cavity during removal.

If deeper penetration of the cervical canal is indicated, a second instrument having a smaller blades can be subsequently inserted and operated to remove a specimen such as that shaded at b in FIG. 7.

The surgeon will appreciate the ease and facility of manipulation inherent in the use of the instrument, as well as how the advantages outlined in the opening remarks of this specification are attained.

Figure 9:
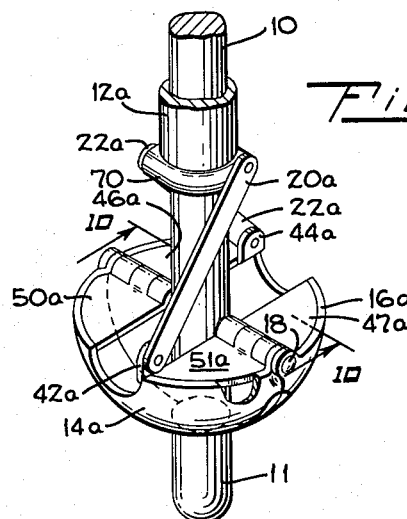
FIG. 9 shows a modified form of blade design and linkage that permits opening the blades a full 180°
Figure 10:
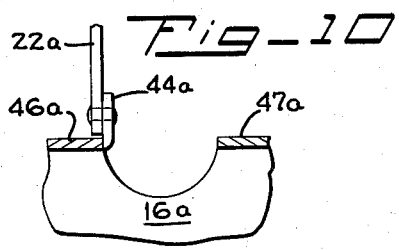
FIG. 10 is a partial section taken on line 10—10 of FIG. 9.

FIGS. 9 and 10 show a slightly modified form of the invention wherein the blades can be opened a full 180° without danger of the operating links locking up. In this form of the invention, blades 14a, 16a are substantially like the blades of the form illustrated in in FIGS. 1–7. The gaps between the plates 46a and 47a on blade 16a, and 50a and 51a and on blade 14a fully receive the shank 10. Links 20a and 22a are pivoted to single ears 42a and 44a on blades 14a and 16a, respectively. The links 20a and 22a cross, and are pivotally connected to a collar 70 secured to the proximal end of sleeve 12a. The mode of operation of the form of FIGS. 9 and 10 is like that previously described in connection with the form illustrated in FIGS. 1–8.

Figure 11:
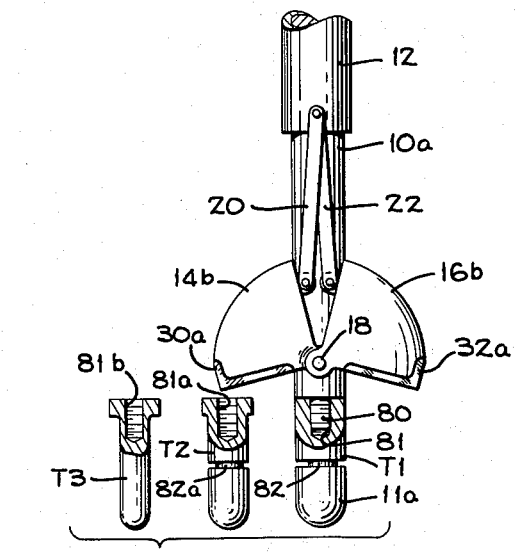
FIG. 11 is a modified form wherein removable tips can be fitted to the shank of the instrument.

FIG. 11 illustrates a modified tip construction which can be applied to either form of the invention, although it is illustrated fitted to the form shown in FIGS. 1–7. The shank 10a of the form of FIG. 11 is formed with a threaded stud 80 for receiving either of a set of tips T1, T2 or T3. These tips each have a threaded socket 81, 81a, and 81b respectively, for mounting on the stud 80. The largest tip T1 is deeply grooved at 82, to receive the relieved sharpened edges 30a and 32a on blades 14b and 16b respectively. In this construction, the groove 82 accommodates smaller radius sharpened edges 30a and 32a and provide a combined cutting and shearing action at the end of the cutting stroke of the blades, to cleanly sever the cervical tissue.

Tip T2 is of smaller radius for penetration of a smaller cervical os, so that its groove 82a is not as deep as is groove 82 in tip T1.

Tip T3, the smallest of the set, need not be grooved, because the edges 30a and 32a of the blades fit it perfectly. Provision for mounting any one of a set of tips, such as those shown in FIG. 11, render the instrument adaptable to anatomical variations that may be encountered.

In the form shown in FIG. 12, the shank 10b has a unitary tip that is grooved at 82b to receive the sharpened edges 30b and 32b of blades 14b and 16b. The radii of such sharpened edges are correspondingly smaller, as in the form of FIG. 11.

In the foregoing description of an embodiment of the invention, the individual blades have been described as semispheres, and the blades cooperate to form a hemisphere. Mathematically, the sphere is merely a special case of a conic section of revolution, wherein a circle is revolved about a diameter. A paraboloid, and one half of a hyperboloid of two sheets, are other surfaces derived from the revolution of a conic section about its axis. Blades formed on these latter patterns will not track the initial wound precisely. Nevertheless, the terms "semispherical" and "hemispherical," as used in the claims, are intended to include blades having a configuration that may deviate somewhat from the spherical pattern, so long as the attendant deviation in wound tracking lies within the range of flesh accommodation. Obviously, such small variants are functionally semi, or hemispherical.

Having thus described my invention so that those skilled in the art may practice the same, I claim:

1. A surgical instrument for conization of the cervix comprising an elongate shank having a projecting proximal tip portion for insertion into the cervix, a pair of semispherical blades pivotally mounted on said shank and surrounding an inner portion of said tip portion of the shank, said blades having cooperating sharpened edges which when closed will excise a substantially hemispherical specimen, and means operable from the distal portion of said shank for opening and closing said blades, the pivot axis of said blades being substantially on a major diameter of the blades and intersecting said tip portion.

2. A surgical instrument for conization of the cervix comprising an elongate shank having a projecting proximal tip portion for insertion into the cervix, a pair of semispherical blades, means passing through said shank for pivotally mounting said blades on said shank adjacent an inner portion of said tip portion of the shank, said blades having cooperating sharpened edges which when closed will excise a substantially hemispherical specimen, a sleeve slidable on said shank, link means pivotally connecting the proximal end portion of said sleeve to said blades, and finger grip means adjacent the distal end of the sleeve and the shank for sliding the sleeve on said shank for opening and closing said blades, said means for pivotally mounting said blades being substantially on a major diameter of the blades.

3. A surgical instrument for conization of the cervix comprising an elongate shank having a proximal tip portion for insertion into the cervix, a pair of semispherical blades pivotally mounted on said shank adjacent said tip portion of the shank, said blades having cooperating sharpened edges which when closed will excise a substantially hemispherical specimen, and means operable from the distal portion of said shank for opening and closing said blades, the sharpened edge of each blade being arcuately relieved to embrace said shank when the blades are closed.

4. A surgical instrument for conization of the cervix comprising an elongate shank having a proximal tip portion for insertion into the cervix, a pair of semispherical blades pivotally mounted on said shank adjacent said tip portion of the shank, said blades having cooperating sharpened edges which when closed will excise a substantially hemispherical specimen, a sleeve slidable on said shank, link means pivotally connecting the proximal end portion of said sleeve to said blades, and finger grip means adjacent the distal end of the sleeve and the shank for sliding the sleeve on said shank for opening and closing said blades, the sharpened edge of each blade being arcuately relieved to embrace said shank when the blades are closed.

5. A surgical instrument for conization of the cervix comprising an elongate shank having a projecting proximal tip portion for insertion into the cervix, a pair of semispherical blades, means passing through an inner portion of said tip portion for pivotally mounting said blades on said shank adjacent said tip portion of the shank, said blades having cooperating sharpened edges which when closed will form a hemisphere to excise a substantially hemispherical specimen, means operable from the distal portion of said shank for opening and closing said blades, and substantially flat plate means for closing the posterior faces of said blades, said tip portion projecting past the blades when the latter are closed.

6. A surgical instrument for conization of the cervix comprising an elongate shank having a proximal tip portion for insertion into the cervix, a pair of semispherical blades pivotally mounted on said shank adjacent said tip portion of the shank, said blades having cooperating sharpened edges which when closed will excise a substantially hemispherical specimen, means operable from the distal portion of said shank for opening and closing said blades, and plate means for closing the posterior faces of said blades, said plate means being spaced to embrace said shank when the blades are open.

7. A surgical instrument for conization of the cervix comprising an elongate shank having a proximal tip portion for insertion into the cervix, a pair of semispherical blades pivotally mounted on said shank adjacent said tip portion of the shank, said blades having cooperating sharpened edges which when closed will excise a substantially hemispherical specimen, a sleeve slidable on said shank, link means pivotally connecting the proximal end portion of said sleeve to said blades, and finger grip means adjacent the distal end of the sleeve and the shank for sliding the sleeve on said shank for opening and closing said blades, said link means crossing to facilitate full opening of said blades, said blades when closed surrounding said tip portion, with the tip portion projecting past the closed blades.

8. A surgical instrument for conization of the cervix comprising an elongate shank having a proximal tip portion for insertion into the cervix, a pair of semispherical blades pivotally mounted on said shank adjacent said tip portion of the shank, said blades having cooperating sharpened edges which when closed will excise a substantially hemispherical specimen, and means operable from the distal portion of said shank for opening and closing said blades, the sharpened edge of each blade being arcuately relieved to embrace said shank when the blades are closed, said shank having a tip, said tip being grooved to receive the arcuately relieved sharpened edges of said blades.

9. A surgical instrument for conization of the cervix comprising an elongate shank having a proximal tip portion for insertion into the cervix, a pair of semispherical blades pivotally mounted on said shank adjacent said tip portion of the shank, said blades having cooperating sharpened edges which when closed will excise a substantially hemispherical specimen, and means operable from the distal portion of said shank for opening and closing said blades, the sharpened edge of each blade being arcuately relieved to embrace said shank when the blades are closed, said shank having a replaceable tip, said tip being grooved to receive the arcuately relieved sharpened edges of said blades.

10. A surgical instrument for conization of the cervix comprising an elongate shank having a proximal tip portion for insertion into the cervix, a pair of semispherical blades pivotally mounted on said shank adjacent said tip portion of the shank, said blades having cooperating sharpened edges which when closed will excise a substantially hemispherical specimen, a sleeve slidable on said shank, link means pivotally connecting the proximal end portion of said sleeve to said blades, finger grips projecting oppositely from adjacent the distal end of said shank, said sleeve having slots formed therein for receiving said finger grips, and a thumb grip mounted on the distal end of said sleeve, said blades surrounding said tip portion when the blades are closed, with the tip portion projecting past the closed blades.

References Cited in the file of this patent

UNITED STATES PATENTS

| | | |
|---|---|---|
| 1,127,948 | Wappler | Feb. 9, 1915 |
| 1,971,611 | Hill | Aug. 28, 1934 |

FOREIGN PATENTS

| | | |
|---|---|---|
| 1,037,403 | France | Apr. 29, 1953 |